M. E. HENNING
April 5, 1932. RESET MECHANISM FOR THERMAL CUT-OUT SWITCHES Re. 18,409
Original Filed June 16, 1930
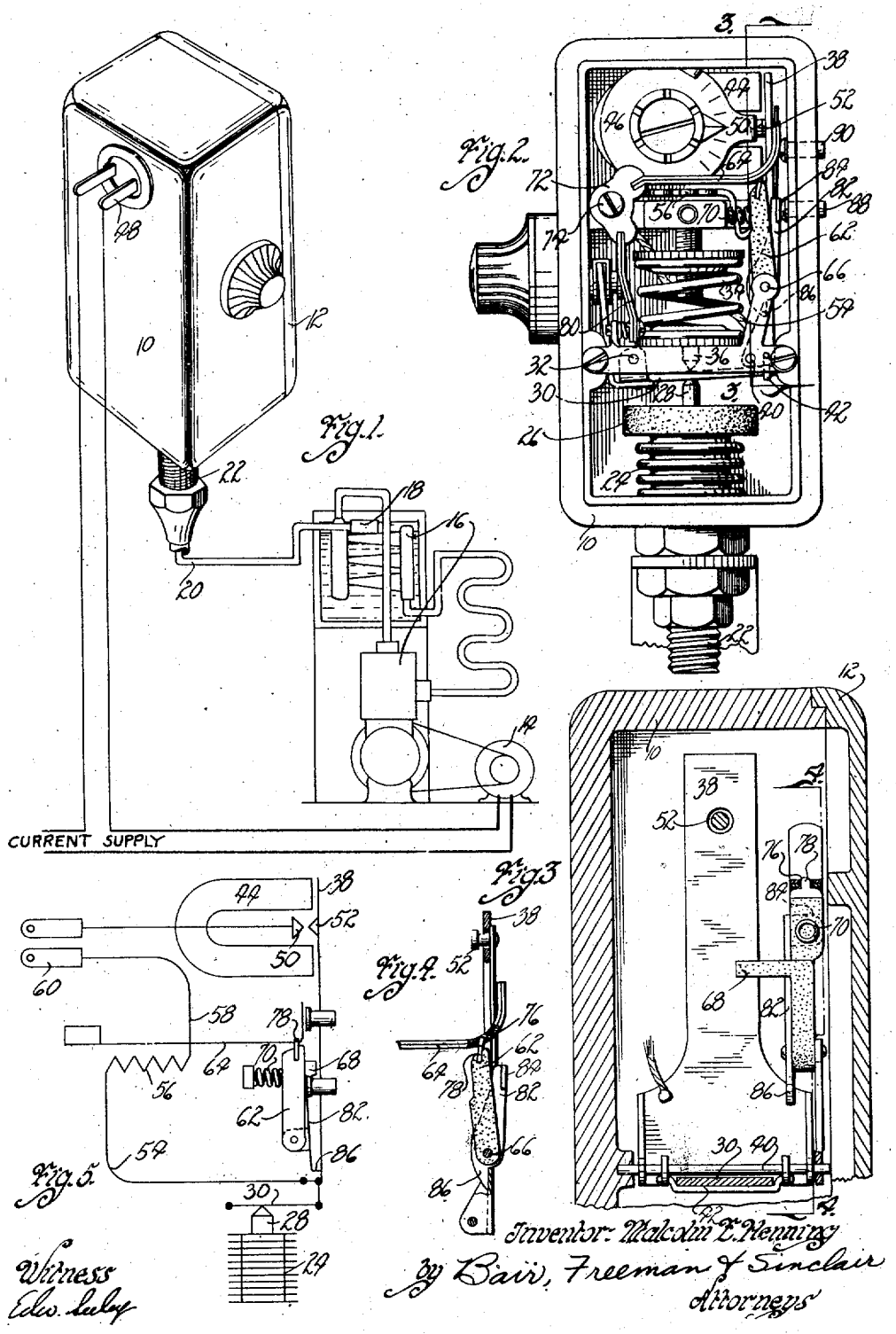
Witness
Edw. Luby
Inventor: Malcolm E. Henning
By Bair, Freeman & Sinclair
Attorneys Reissued Apr. 5, 1932

Re. 18,409

UNITED STATES PATENT OFFICE

MALCOLM E. HENNING, OF DES MOINES, IOWA, ASSIGNOR TO PENN ELECTRIC SWITCH CO., OF DES MOINES, IOWA, A CORPORATION OF IOWA

RESET MECHANISM FOR THERMAL CUT-OUT SWITCHES

Original No. 1,841,477, dated January 19, 1932, Serial No. 461,546, filed June 16, 1930. Application for reissue filed January 25, 1932. Serial No. 588,799.

The object of my present invention is to provide a reset mechanism for switches which have overload cutouts of current responsive type, the mechanism being simple and effective in its operation.

A further object is to provide a reset mechanism for thermal cutout switches or the like which will positively prevent the possibility of manually holding the switch in closed circuit position when the current responsive cutout device is in open circuit position.

More particularly, it is my object to provide the combination with a switch member movable to open and closed circuit positions and a current responsive circuit opening mechanism for the switch member, of a reset member movable to reset the current responsive mechanism and at the same time operable to retain the switch member in open circuit position whereby to prevent closure of the switch member except when the reset member is released or the current responsive means when reset is in position to allow movement of the switch member to closed circuit position.

With these and other objects in view, my invention consists in the construction, arrangement and combination of the various parts of my device, whereby the objects contemplated are attained, as hereinafter more fully set forth, pointed out in my claims and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings, in which:

Figure 1 is a perspective view of an automatic switch structure showing it diagrammatically connected with a mechanical refrigerator.

Figure 2 is an enlarged front elevation of the switch showing the cover removed.

Figure 3 is an enlarged sectional view on the line 3—3 of Figure 2.

Figure 4 is a sectional view on the line 4—4 of Figure 3; and

Figure 5 is a diagrammatic view of the parts and electrical connections of the switch.

On the accompanying drawings, I have used the reference numeral 10 to indicate a switch casing. A cover 12 is provided therefor.

The particular switch illustrated is of the automatic type for controlling the supply of electric current to a machine such as the motor 14 of a mechanical refrigerating system 16, the temperature of which controls the switch through a temperature responsive element 18 and connecting tube 20.

The tube 20 is connected with a fitting 22 which communicates with a bellows 24 whereby variations in temperature in the element 18 will contract and expand the bellows 24. A head 26 of the bellows 24 carries a pin 28, which engages one side of a primary lever 30. The lever 30 is pivoted on a pin 32.

A spring 34 is provided with a pin 36 contacting with the opposite side of the primary lever 30 whereby the spring opposes the bellows 24 and balances the lever 30 between the bellows and the spring. The spring 34 is preferably adjustable.

A switch arm 38 is pivoted on a pin 40 and operatively connected with the primary lever 30 by a link 42. A permanent magnet 44 acts upon the switch arm 38 to pull it toward a closed circuit position in opposition to the spring 34 which tends to move the switch arm to an open circuit position. Variations in the expansion or contraction of the bellows 24 will move the switch arm to open and closed positions, depending on the temperature or pressure action upon the bellows.

A stationary contact plate 46 is connected with a contact prong 48 and carries a contact 50. The switch arm 38 carries a contact 52. The switch arm 38 and consequently the contact 52 are connected by a flexible lead 54 with one end of a heating element 56. The other end of the heating element 56 is connected by a wire 58 with a second contact prong 60.

In connection with the movable switch arm 38, a thermal cutout mechanism is provided consisting of a cutout arm 62 and a thermal latch 64 therefor. The cutout arm 62 is pivoted on a pin 66 and is provided with an extension 68 in position to engage the switch arm 38, when a spring 70 is allowed to move the cutout arm 62 toward the right, as viewed in Figure 2. The thermal latch 64 is a strip of bimetallic metal having one end anchored to a fitting 72, which is pivoted on a screw 74. The thermal bar 64 is provided with an opening 76 into which a latch lug 78 of the thermal cutout arm 62 may extend when the arm 62 is in latched position. The fitting 72 is connected with a second thermal bar 80 mounted in opposition to the thermal latch 64 so as to prevent external temperature changes from affecting the operation of the cutout.

From the foregoing description, it will be obvious that when the cutout lever 62 is latched by the thermal latch 64, the extension 68 cannot contact with the switch arm 38 and normal automatic operation of the switch arm is had.

Whenever an overload current flows through the switch, however, it will raise the temperature of the heating element 56 for warping the thermal latch 64 to an unlatched position whereby the spring 70 will cause the released arm 62 to swing to the right, as viewed in Figure 2 and the extension 68 will engage the switch arm 38 and separate the contacts 50 and 52. Thus any damage to the motor 14 is prevented when an overload, caused by clogging of the refrigeration pipes or any other cause, is thrown onto the motor.

My reset mechanism consists of a reset lever 82 pivoted on the pin 66 and having on one end an ear 84 adapted to engage the cutout lever 62 and on its other end an extension 86 adapted to engage the switch lever 38. A reset button 88 is engageable with the ear 84 for moving the levers 82 and 62 to reset position. A release button 90 is provided for unlatching the bar 64 from the latch lug 78 of the cutout lever 62 whereby the switch may be allowed to open the circuit by a manual control.

In my co-pending application, Serial No. 448,256, filed April 29, 1930, the button 88 contacted directly with the cutout arm 62 and there was danger in the use of such a switch that someone, when desiring the motor to continue to operate for even a short period of time after the thermal cutout had opened the switch, would hold the button in and thus hold the circuit in closed position and possibly burn out the motor or cause other damage because of the excessive current flowing through the circuit.

The main object of my present invention is to eliminate such danger and I have, therefore, provided the reset lever 82 with the lug 86 to engage the switch arm 38 and positively hold it in an open circuit position while the button 88 is being held in. Thus the switch can move again to closed circuit position only after the reset button 88 has been released and providing the latch 64 is not again moved to unlatched position by excessive current flowing through the heating element 56. Thus it becomes necessary to locate and correct the trouble before the circuit can be reestablished and maintained.

All danger of improper holding of the switch in closed circuit position is eliminated.

Instead of the button 88, the reset lever 82 may be moved to reset position by any other desired means.

Some changes may be made in the construction and arrangement of the various parts of my device without departing from the real spirit and purpose of my invention, and it is my intention to cover by my claims, any modified forms of structure or use of mechanical equivalents, which may be reasonably included within their scope.

I claim as my invention:

1. In a reset mechanism for thermal cutout switches, the combination with a switch member normally movable to open and closed circuit positions, circuit opening means for independently moving said switch member to open circuit position and a thermal latch for said means, of a reset member movable to latch said circuit opening means by means of said thermal latch, said reset member being operatively connected with said switch member to retain it in open circuit position upon such latching movement of the reset member.

2. In a reset mechanism of the character disclosed, the combination with a switch having a stationary contact and a movable contact and current responsive mechanism for disengaging said movable contact from said stationary contact, of reset means for said mechanism comprising a reset member movable to resetting position and operatively connected with the switch for retaining the same in open position when the reset member is so moved.

3. In a reset mechanism of the character disclosed, the combination with a switch having a stationary contact and a movable contact and current responsive mechanism for disengaging said movable contact from said stationary contact, of reset means for said mechanism comprising a pivoted reset lever movable to resetting position and engageable with the switch for retaining the same in open position when the reset lever is so moved.

4. In a reset mechanism of the character disclosed, the combination with a switch member normally movable to open and closed circuit positions and current responsive mechanism to independently move the switch member to open circuit position upon an overload current flowing through the circuit controlled by the switch member, of reset means for said mechanism comprising a movable reset member and means for moving the same to resetting position and simultaneously therewith retaining said switch member in open circuit position.

5. In a reset mechanism of the character disclosed, the combination with power means, a switch member movable thereby to open and closed circuit positions and current responsive mechanism to move the switch member to open circuit position independently of said power means upon an overload current flowing through the circuit controlled by the switch member, of reset means for said mechanism comprising a reset member movable to reset position and simultaneously engageable with the switch member to retain the same in open circuit position.

6. In a reset mechanism of the character disclosed, the combination with power means, a switch member movable thereby to open and closed circuit positions and current responsive mechanism to move the switch to open circuit position independent of said power means upon an overload current flowing through the circuit controlled by the switch member, of reset means for said mechanism comprising a reset lever pivotally mounted, and means to impart pivotal movement to said reset lever to move the same to reset position, said reset lever having an operative connection with said switch member to retain the same in open circuit position when the reset lever is moved to reset position.

7. In a reset mechanism of the character disclosed, the combination with a switch member normally movable to open and closed circuit positions and current responsive mechanism to move the switch member independent of its normal movement to open circuit position upon an overload current flowing through the circuit controlled by the switch member, of reset means for said mechanism comprising a reset lever pivotally mounted and means to impart pivotal movement to said reset lever to move the same to reset position, said reset lever being engageable with said switch member to retain the same in open circuit position, when the reset lever is moved to reset position.

8. In a reset mechanism of the character disclosed, the combination with power means, a switch member movable thereby to open and closed circuit positions and current responsive mechanism to move the switch member to open circuit position independently of said power means upon an overload current flowing through the circuit controlled by the switch member, of reset means for said mechanism comprising a reset member movable to reset position and engageable with the switch member to retain the same in open circuit position so long as said reset member remains in resetting position.

9. In a reset mechanism of the character disclosed, the combination with power means, a switch member movable thereby to open and closed circuit positions and current responsive mechanism to move the switch member to open circuit position independently of said power means upon an overload current flowing through the circuit controlled by the switch member, of reset means for said mechanism comprising a reset member movable to reset position and engageable with the switch member to prevent the same moving to closed circuit position so long as said reset member remains in resetting position.

10. In a reset mechanism of the character disclosed, the combination with a switch having a stationary contact and a movable contact normally tending to move towards closed circuit position and current responsive mechanism for disengaging said movable contact from said stationary contact, of reset means for said mechanism comprising a reset member movable to resetting position and operatively connected with the movable contact of the switch for preventing the movable contact from engaging the stationary contact while said resetting member remains in resetting position.

11. In a reset mechanism of the character disclosed, the combination with a switch having a stationary contact and a movable contact and current responsive mechanism for disengaging said movable contact from said stationary contact, of reset means for said mechanism comprising a pivoted reset lever movable to resetting position and engageable with the movable contact of the switch for preventing its engagement with the stationary contact when the reset means is in resetting position.

Des Moines, Iowa, January 22, 1932.

MALCOLM E. HENNING.